(12) United States Patent
Kessler

(10) Patent No.: US 10,679,791 B2
(45) Date of Patent: Jun. 9, 2020

(54) ARRANGEMENT AND METHOD FOR CONTACTING ELECTRICAL COMPONENTS

(71) Applicant: Robert Bosch GmbH, Stuttgart (DE)

(72) Inventor: Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 15/114,544

(22) PCT Filed: Dec. 16, 2014

(86) PCT No.: PCT/EP2014/077985
§ 371 (c)(1),
(2) Date: Jul. 27, 2016

(87) PCT Pub. No.: WO2015/113695
PCT Pub. Date: Aug. 6, 2015

(65) Prior Publication Data
US 2016/0343505 A1    Nov. 24, 2016

(30) Foreign Application Priority Data

Jan. 30, 2014   (DE) .................. 10 2014 201 631

(51) Int. Cl.
*H01G 4/228*   (2006.01)
*H02M 7/00*    (2006.01)

(52) U.S. Cl.
CPC ............ *H01G 4/228* (2013.01); *H02M 7/003* (2013.01)

(58) Field of Classification Search
CPC .............................. H01G 4/228; H02M 7/003
See application file for complete search history.

(56) References Cited

U.S. PATENT DOCUMENTS 5,132,896 A * 7/1992 Nishizawa ............ H02M 7/003
361/707
5,493,471 A * 2/1996 Walther ................. H01G 4/38
307/109

(Continued)

FOREIGN PATENT DOCUMENTS

CN       101809741 A    8/2010
DE     102009046914    8/2010

(Continued)

OTHER PUBLICATIONS

International Search Report for Application No. PCT/EP2014/077985 dated Mar. 31, 2015 (English Translation, 3 pages).

*Primary Examiner* — David M Sinclair
(74) *Attorney, Agent, or Firm* — Micheal Best & Friedrich LLP

(57) ABSTRACT

The invention relates to an arrangement comprising a first electrical component, which has a pair of flat, spaced-apart first connection lugs, a second electrical component, which has a pair of flat, spaced-apart second connection lugs, wherein the first and second connection lugs are in each case connected in pairs in an electrically conductive manner, and an electrically conductive plate which is electrically insulated from the first and second connection lugs and which is arranged below the first and second connection lugs in the plane of the surfaces of the first and second connection lugs.

7 Claims, 1 Drawing Sheet

(56) References Cited

U.S. PATENT DOCUMENTS

| | | | | |
|---|---|---|---|---|
| 6,144,556 | A | * | 11/2000 | Lanclos ............. H05K 7/20145 361/695 |
| 6,166,937 | A | * | 12/2000 | Yamamura ............ H01L 23/473 257/E23.098 |
| 6,186,831 | B1 | * | 2/2001 | Tsai ........................ H01R 4/34 174/70 B |
| 6,522,544 | B1 | * | 2/2003 | Kimoto ................ H02M 7/003 257/724 |
| 8,480,419 | B2 | * | 7/2013 | Holbrook ................ B60R 25/00 174/72 B |
| 8,848,341 | B2 | * | 9/2014 | Sherwood ............. H01G 9/008 361/520 |
| 2002/0011363 | A1 | * | 1/2002 | Shirakawa ............ H02M 7/003 180/65.22 |
| 2003/0223179 | A1 | * | 12/2003 | Mishima .................. H01G 2/04 361/520 |
| 2006/0255448 | A1 | * | 11/2006 | Nagase ................ H01L 25/072 257/692 |
| 2008/0182168 | A1 | * | 7/2008 | Byun .................... H01M 2/204 429/158 |
| 2010/0178813 | A1 | | 7/2010 | Holbrook |
| 2011/0228508 | A1 | * | 9/2011 | Inuduka ................ H02M 7/003 361/811 |
| 2011/0242725 | A1 | * | 10/2011 | Herrmann ................ H01G 2/04 361/306.2 |
| 2012/0100407 | A1 | * | 4/2012 | Inoue ...................... H01G 2/04 429/94 |
| 2012/0320645 | A1 | | 12/2012 | Fujino et al. |
| 2014/0118909 | A1 | * | 5/2014 | Matsuno ............... H02M 7/003 361/679.01 |

FOREIGN PATENT DOCUMENTS

| | | | | |
|---|---|---|---|---|
| DE | 102011007315 A1 | * | 10/2012 | ............. H01G 2/08 |
| DE | 102012008750 | | 12/2012 | |
| EP | 1174992 | | 1/2002 | |
| EP | 1919069 | | 5/2008 | |
| EP | 2023473 | | 2/2009 | |
| JP | 08140338 A | * | 5/1996 | |
| JP | 2001307948 A | | 11/2001 | |
| JP | 2002112530 A | | 4/2002 | |
| JP | 2010252460 A | * | 11/2010 | |
| JP | 2011233795 A | | 11/2011 | |
| JP | 2013009501 A | | 1/2013 | |
| JP | 2014017446 A | * | 1/2014 | |
| JP | 2015084609 A | * | 4/2015 | |

* cited by examiner

ARRANGEMENT AND METHOD FOR CONTACTING ELECTRICAL COMPONENTS

BACKGROUND OF THE INVENTION

The invention relates to an arrangement and a method for contacting electrical components, in particular of a DC intermediate circuit comprising electrical supply lines.

Direct current is typically removed from energy storage cells or, respectively, direct current is fed into said energy storage cells. For that reason, the design of energy storage cells is laid out for the optimization of the ohmic internal resistances and the specific energy or power density of the energy storage cells.

In many applications of electrical storage cells, storage cells are connected to one another in a series or parallel arrangement to form battery modules in order to set desired output parameters such as total voltage, voltage range, energy content or power density. If currents having an increasing AC component are removed from such energy storage cells, the influence of the distributed inductance of the energy storage cells increases in accordance with the frequency. The inductive losses of an energy storage cell are composed of the individual components of the loss amounts of the electrodes, the pole interconnection and the arrangement of the electrodes in the housing. Furthermore, losses in the current carrying regions as well as eddy currents in electrically conductive surfaces, for example in the housing, occur at operating frequencies in the kHz range as a result of the skin effect.

Also in the case of relevant inverters and converters, which are used to actuate the electrical storage cells, the inductive losses can lead to overvoltages at the semiconductor switches used in each case, which can in turn lead to and increased load on components and even to the irreversible destruction of the semiconductor elements. As previously mentioned, eddy currents and undesirable resonant circuit oscillations can occur in connection with the inverters and converters, which can lead to a further load on the components and to problems with the electromagnetic compatibility.

The German patent publication DE 10 2009 046 914 B4 discloses a connection arrangement for a bus bar system, which has a reduced inductance and comprises a primary bus bar arrangement comprising a single mounting element. The connection arrangement includes two substantially overlapping, conductive and electrically isolated bridge electrodes, wherein each electrode is designed in such a way that said electrode couples a positive or a negative electrode of the primary bus bar arrangement to a power module input contact of the same polarity. Each bridge electrode has a connecting link which is designed for an electrical coupling to one of two overlapping connection lugs in the primary arrangement. The connecting links and connection lugs all overlap at a single intersection and are secured by a single mounting element.

The German patent publication DE 10 2012 008 750 A1 discloses an adapter for the electrical connection of intermediate circuits to bus bars, which comprises a layer by layer construction of bus bars comprising connecting links that are arranged in a staggered manner.

There is however a need for solutions for the electrical connection between electrical components, said solutions having lower inductive losses with regard to the removal of AC currents of higher frequency.

SUMMARY OF THE INVENTION

According to one aspect, the present invention relates to an arrangement comprising a first electrical component, which has a pair of flat, spaced-apart first connection lugs, a second electrical component, which has a pair of flat, spaced-apart second connection lugs, wherein the first and second connection lugs are in each case connected in pairs in an electrically conductive manner, and an electrically conductive plate which is electrically insulated from the first and second connection lugs and which is arranged below the first and second connection lugs in the plane of the surfaces of the first and second connection lugs.

According to a further aspect, the present invention relates to a method for contacting electrical components, comprising the following steps: overlapping of first flat connection lugs of a first electrical component with second flat connection lugs of a second electrical component, connecting the pairs of first and second connection lugs in an electrically conductive manner, and arranging an electrically conductive plate below the pairs of first and second connection lugs, wherein the electrically conductive plate is electrically insulated from the first and second connection lugs.

It is a concept of the present invention to check the inductive losses, which can come into effect as a result of electrical connections which are guided juxtaposed in high frequency switching operations, by reducing the eddy currents in the electrical connection lugs of the electrical components. To this end, an electrically conductive plate is disposed below or above the connection lugs in such a way that, in the case of AC currents of higher frequency, eddy currents are generated in the electrically conductive plate, which generate a magnetic field that is directed oppositely to the magnetic field generated by means of the AC currents in the effective area enclosed by the connection lugs. As a result, the effective inductance of the connection contacts between the electrical components is reduced and the inductive losses are lowered.

It should particularly be emphasized in this type of arrangement that connection lugs stacked on top of one another can be avoided, for example if a compliance with the requirements with regard to air and/or creepage distance cannot be ensured by stacked or superimposed connection lugs. In addition, a considerable cost advantage resulting from a simplified implementation can be achieved by means of a juxtaposed arrangement of the connection lugs with respect to superimposed connection lug geometries. This type of electrical connection is also preferable for conventional components having juxtaposed connection lugs because a costly and complex connection technology can be avoided without losing the advantage of a low inductive coupling to other components.

A significant advantage of the arrangement according to the invention is that the lost energy can be considerably reduced when withdrawing alternating current of a high frequency from a connected energy storage module. The reduction of lost energy is of great advantage particularly in battery systems comprising an integrated inverter, a so-called battery direct inverter (BDI), with which a quick change of the current feed through a battery module takes place to vary the current voltage.

A further advantage is that the short-term dynamics of such energy storage modules are improved by the delay of the energy or load output of electrical components, such as a film capacitor, being minimized after load changes. As a result, components that are otherwise possibly compensatory, such as, for example, buffer capacitors, can be eliminated which can reduce the installation space requirements as well as the manufacturing costs of such arrangements.

In addition, the electromagnetic compatibility (EMV) can be improved by avoiding inductive loss components because the ascertained electromagnetic fields can be reduced and interferences on adjacent electronic components can be reduced. Ohmic losses are furthermore reduced to the greatest possible extent due to the skin effect, which advantageously entails an increased degree of efficiency and less heat development.

If a cooling plate is furthermore used simultaneously as an inductance lowering plate on a free lateral surface of an electrical component, an optimal heat dissipation as well as a lowering of the inductive loss shares can be simultaneously realized with the same installation space and implementation costs.

According to one embodiment, the arrangement according to the invention can furthermore have an insulation layer, which is disposed between the first and second connection lugs and the electrically conductive plate.

In so doing, the insulation layer can be adhesively bonded on the second connection lugs and the electrically conductive plate on the insulation layer in the arrangement according to the invention.

According to a further embodiment of the arrangement according to the invention, the insulation layer can constitute a dielectric layer having a high dielectric constant, which forms a capacitive path between the connection lugs. This facilitates a further reduction in the inductive resistance of the connection lugs between the electrical components.

The arrangement according to the invention can alternatively comprise a multiplicity of electrically conductive elevated portions, which are disposed on the electrically conductive plate in a region below at least one of the first and second connection lugs.

According to a further embodiment of the arrangement according to the invention, the electrically conductive plate can be designed as a cooling plate, which is disposed planarly parallel along one of the lateral surfaces of the first electrical component and which is designed to dissipate waste heat from the first electrical component that develops during the operation of the first electrical component. Such cooling plates can already be present in electrical components such as capacitors in order to ensure that heat is dissipated from the metallic conductors of the electrical components. It is particularly advantageous if such cooling plates are used to serve the dual function of inductance reduction.

According to a further embodiment of the arrangement according to the invention, the first electric component can be a film capacitor and the second electrical component can be an electrical bus bar. Precisely between these two components, it is desirable to achieve a significant reduction in the active parasitic inductances during switching operations in semiconductor switches connected to the bus bar. This can be ensured by the arrangement according to the invention without the need for superimposed supply and return conductors.

BRIEF DESCRIPTION OF THE DRAWINGS

Further features and advantages of embodiments of the invention ensue from the following description with reference to the attached drawings.

In the drawings.

DETAILED DESCRIPTION

The direction terminology used below, i.e. terms like "left", "right", "up", "down", "front", "back", "above", "behind" and the like, is only used to clarify the drawings and should in no case represent a limitation of the general use. Identical reference signs generally designate similar or similarly functioning components.

Connection lugs in the sense of the present invention are flat material pieces with which two components can be connected via connection means, such as screws and nuts, bolts or rivets. In so doing, connection lugs can protrude outwardly from lateral surfaces of the associated components. Connection lugs in the sense of the present invention can be manufactured from different electrically conductive, e.g. metallic, materials in order to be able to provide an electrical contacting of the associated electrical components to the outside. Connection lugs in the sense of the present invention can be manufactured so as to be coated, filled three dimensionally or/and to have a large active surface. Flat connection lugs can thus have different dimensions. The flat form of the connection lugs can be configured square, rectangular, round, elliptical or in any other way.

Figure 1:
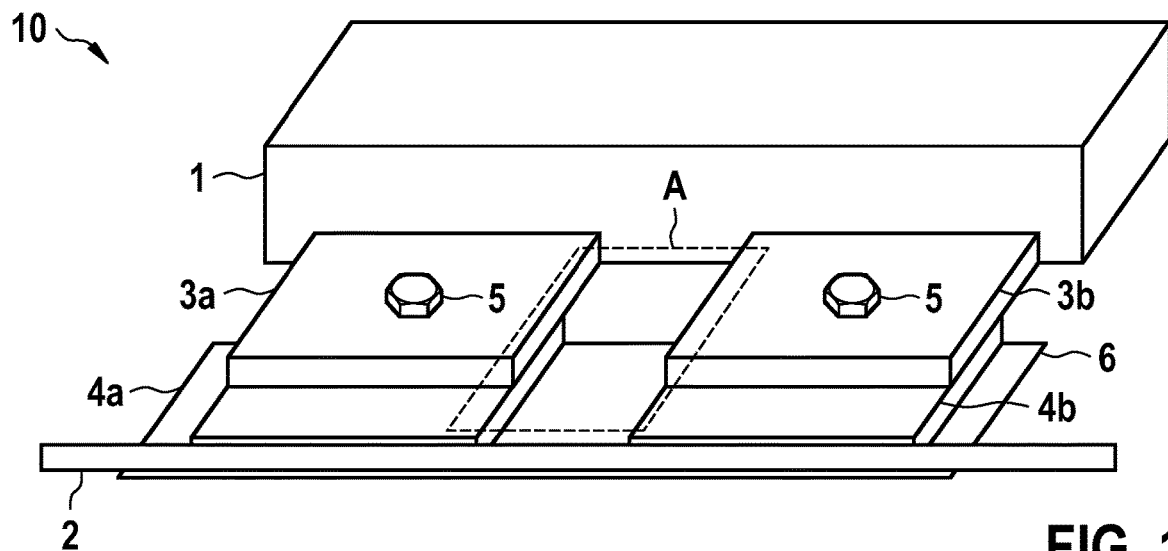
FIG. 1 shows a schematic isometric depiction of an arrangement of electrical components comprising connection lugs according to one embodiment of the invention.

FIG. 1 shows a schematic depiction of an arrangement 10 of electrical components and the electrical contacting thereof via connection lugs. The arrangement 10 comprises a first electrical component 1, for example a film capacitor or an electrolyte capacitor, as well as a second electrical component 2, for example an electrical bus bar. The first electrical component 1 has a pair of flat first connection lugs 3a and 3b that are spaced apart laterally from one another. The second electrical component 2 has a pair of flat second connection lugs 4a and 4b that are spaced apart laterally from one another. The connection lugs 3a and 3b or 4a and 4b are fixedly connected to and in electrically conductive contact with the respective electrical component 1 or 2. The connection lugs 3a and 3b or 4a and 4b can be formed integrally with the respective electrical component 1 or 2. It can also be possible to couple the connection lugs 3a and 3b or 4a and 4b as separate connection pieces to the respective electrical components 1 or 2.

In the present example of FIG. 1, the connection lugs 3a and 3b or 4a and 4b are depicted as rectangular plates, wherein other lug shapes, such as, e.g., square, trapezoid, circular or oval are also possible. The connection lugs 3a and 3b or 4a and 4b are in each case brought into electrical contact with one another and connected to one another, for example via connection means, such as screws 5 as depicted by way of example in FIG. 1.

The connection lugs 3a and 3b or 4a and 4b can each carry current of a different current direction or, respectively, be supplied with voltage of different polarity. If the pairs of first connection lugs 3a and 3b as well as of second connection lugs 4a and 4b are disposed adjacent to one another and spaced apart from one another at a minimum distance, a surface A results which is enclosed by the first electrical component 1, the second electrical component 2 and the two connection lugs 3a and 3b or 4a and 4b which are connected in pairs. In the case of a circuit current, which is conducted around this surface A, magnetic fields develop which penetrate the surface A. The larger the surface A is, the higher is the inductive resistance of the connection geometry formed by the connection lugs 3a and 3b or 4a and 4b.

It is generally advantageous to keep the distances between current carrying elements of both polarities as small as possible in order to minimize the active flux surface enclosed by these elements, i.e. to minimize the inductive impedance of the current carrying elements. It is furthermore advantageous, to configure the current carrying elements as large-scale as possible in order to distribute the current density as homogenously as possible. An ideally flat contacting between the connection lugs 3a and 3b or 4a and 4b is, however, often only possible under certain boundary conditions, such as, for example, safety requirements or technical constraints. For that reason, a minimum distance is to be maintained in each case between the pairs of connection lugs 3a and 3b or 4a and 4b, which in turn leads to a minimum inductance of the connection geometry. In particular in the AC mode, ohmic losses therefore occur due to the skin effect; and, as a result, the electrical components 1 and 2 heat up in an undesirable manner in the region of the connection lugs 3a and 3b or 4a and 4b.

An electrically conductive plate 6 is therefore provided in the arrangement 10, said plate being electrically insulated from the first and second connection lugs 3a, 3b, 4a, 4b and being disposed below the first and second connection lugs 3a, 3b, 4a and 4b in the plane of the surfaces of the first and second connection lugs 3a, 3b, 4a and 4b. The inductance of the connection of the first electrical component 1 to the second electrical component 2, said connection being formed by the connection lugs 3a, 3b, 4a, 4b, does not change in the DC mode or only insignificantly. In contrast in the AC mode, eddy currents are induced in the electrically conductive plate 6, which currents produce a magnetic field which penetrates the surface A in the direction opposite to the magnetic field produced by the currents in the connection lugs 3a, 3b, 4a, 4b. As a result, the effective inductive resistance of the connection lugs 3a, 3b, 4a, 4b is reduced.

On the one hand, the inductive losses of the arrangement 10 can thereby be reduced in the AC mode. On the other hand, a more favorable current density distribution in the connection lugs 3a, 3b, 4a and 4b results from the presence of the electrically conductive plate 6, whereby lower ohmic losses and lower heat production can in turn be observed in the connection lugs 3a, 3b, 4a and 4b.

Figure 2:
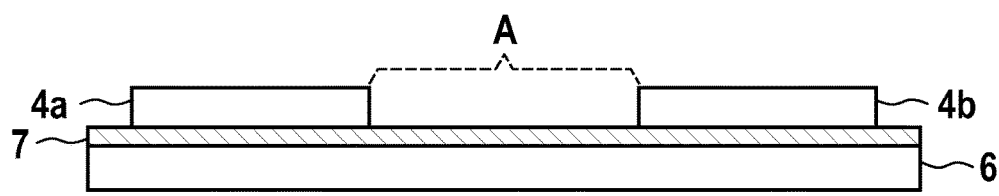
FIG. 2 shows a schematic depiction of a cross section through the connection lug geometry of an arrangement pursuant to FIG. 1 in accordance with a further embodiment of the invention.
Figure 3:
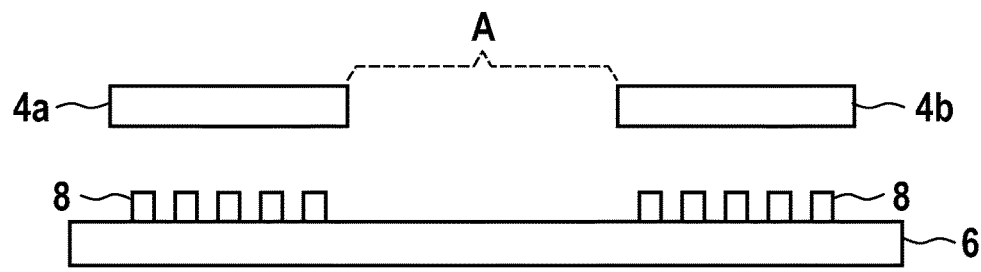
FIG. 3 shows a schematic depiction of a cross section through the connection lug geometry of an arrangement pursuant to FIG. 1 in accordance with a further embodiment of the invention.

As is indicated schematically in cross section in FIGS. 2 and 3, different options for the arrangement of the electrically conductive plate 6 can be provided. For reasons of clarity, only the lower connection lugs 4a and 4b are depicted in each case, said connection lugs being spaced apart from one another in the lateral direction at the distance of the extent of the surface A.

As is shown in FIG. 2, the electrically conductive plate 6 can be connected to the connection lugs 4a and 4b via an insulation layer 7 in order to ensure a galvanic separation between the connection lugs 4a and 4b and the electrically conductive plate 6. The insulation layer 7 can be embodied as a dielectric film having a high dielectric constant, which forms a low-inductance, capacitive path between the connection lugs 4a and 4b. The insulation layer 7 can be adhesively bonded to the connection lugs 4a and 4b or to the electrically conductive plate 6.

As an alternative thereto, as shown in FIG. 3, the electrically conductive plate 6 can be disposed at a greater distance from the connection lugs 4a and 4b so that the electrical insulation with respect to the connection lugs 4a and 4b is ensured via an air gap. One or a plurality of electrically conductive elevated portions 8 or domes can be affixed on the electrically conductive plate 6 below the surface A, i.e. in a region below at least one of the first and second connection lugs 3a and 3b or 4a and 4b. It is also possible to affix elevated portions below both of the connection lugs 3a and 3b or, respectively 4a and 4b. The elevated portions 8 can have a suitable external shape, for example ashlar-shaped, dome-shaped, hemispherical or pyramidal. The number of the elevated portions 8 is variable and is adapted to the size of the individual elevated portions 8 and the surface of the connection lugs 3a and 3b or 4a and 4b.

It can furthermore be advantageous for the arrangement 10 for a cooling plate, which is mounted on a lateral surface of the first or second electrical component 1 or 2, to be used as an electrically conductive plate 6. The cooling plate can thus be disposed planarly parallel along one of the lateral surfaces of the first or second electrical component 1 or 2. The cooling plate can, for example, comprise a metallic layer which consists of material having high thermal conductivity and which is designed to dissipate waste heat to the surrounding environment during the operation of the first or second electrical component 1 or 2.

The cooling plate can protrude beyond the lateral surface of the first or second electrical component 1 or 2 and be guided below the connection lugs 4a or, respectively, 4b. As a result, the cooling plate can, on the one hand, be used for inducing eddy currents below the connection lugs 4a and 4b and, on the other hand, for dissipating heat from the connection of the first and second electrical components 1 and 2.

The arrangement 10 depicted can, for example, be used in a preferable manner in systems in which AC currents of high frequency are withdrawn from the energy storage cells, for example in battery cycloconverters having actuation frequencies above approximately 100 Hz. In these systems, inductive losses resulting from high AC frequency can be minimized. At the same time, the response behavior of the energy storage cells is improved in the short-term range, which considerably improves the dynamics and reliability of the systems.

Figure 4:
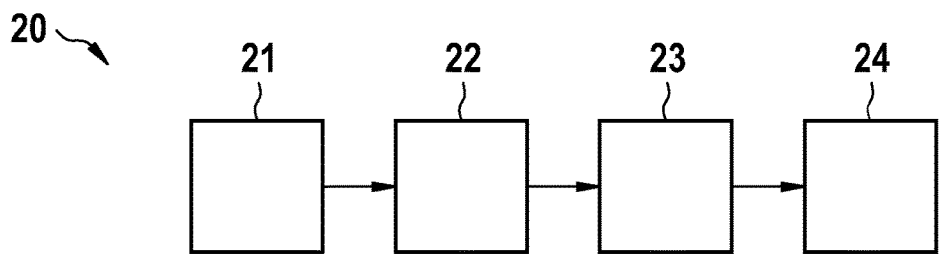
FIG. 4 shows a schematic depiction of a method for contacting electrical components according to a further embodiment of the invention.

FIG. 4 shows a schematic depiction of a method 20 for contacting electrical components. The method 20 can particularly be used for producing the arrangement 10 explained in connection with FIGS. 1 to 3. In a first step 21, first flat connection lugs 3a, 3b of a first electrical component 1, for example a film capacitor, are overlapped in pairs by second flat connection lugs 4a, 4b of a second electrical component 2, for example an electrical bus bar. In a second step 22 the pairs of first and second connection lugs 3a, 3b or 4a, 4b are connected in an electrically conductive manner. In step 23, an insulation layer 7 can optionally be disposed between the first and second connection lugs 3a, 3b or 4a, 4b and an electrically conductive plate 6. Finally in step 24, the electrically conductive plate 6 is disposed below the pairs of first and second connection lugs 3a, 3b or 4a, 4b, wherein the electrically conductive plate 6 is electrically insulated from the first and second connection lugs 3a, 3b or 4a, 4b.

What is claimed is:

1. An arrangement (10), comprising:
a first electrical component (1) having a first main body and a pair of flat, first connection lugs (3a, 3b) that each extend from a side of the main body along a first direction and are spaced apart from one another along a second, lateral direction that is perpendicular to the first direction;
a second electrical component (2) having a second main body and a pair of flat, second connection lugs (4a, 4b) that each extend from a side of the second main body along a direction opposite to the first direction and are spaced apart from one another along the second, lateral direction, wherein one of the first connection lugs overlaps with one of the second connection lugs along a third direction that is perpendicular to both the first and second directions, and wherein the other first connection lug overlaps with the other second connection lug along the third direction;
an electrically conductive plate (6) which is electrically insulated from the first and second connection lugs (3a, 3b; 4a, 4b) and which is arranged below the first and second connection lugs (3a, 3b; 4a, 4b); and
a multiplicity of electrically conductive elevated portions (8) which are disposed in a region below at least one of the first and second connection lugs (3a, 3b; 4a, 4b) and extend upwardly from the electrically conductive plate (6), wherein an air gap is disposed between the first and second connection lugs (3a, 3b; 4a, 4b) and the conductive elevated portions (8);
wherein the electrically conductive plate (6) is a planar cooling plate, wherein the cooling plate protrudes underneath the first and second lugs (4a, 4b), and is configured to dissipate waste heat from the first electrical component (1), said waste heat developing during operation of the first electrical component (1);
wherein the first electrical component (1), the second electrical component (2), and the first and second connection lugs (3a, 3b, 4a, 4b) together form an open region (A) therebetween such that currents in the first and second connection lugs (3a, 3b, 4a, 4b) are configured to produce magnetic fields that penetrate the region (A), wherein eddy currents are configured to generate in the electrically conductive plate (6), wherein the eddy currents are configured to generate magnetic fields that penetrate the region (A) in a direction opposite to the magnetic fields generated by the currents in the first and second connection lugs (3a, 3b, 4a, 4b), and wherein the elevated portions (8) are not directly located under the open region (A) along the third direction.

2. The arrangement (10) according to claim 1, further comprising:
an insulation layer (7) which is arranged between the first and second connection lugs (3a, 3b; 4a, 4b) and the electrically conductive plate (6).

3. The arrangement (10) according to claim 2, wherein the insulation layer (7) constitutes a dielectric film which has a high dielectric constant and forms a low-inductance, capacitive path between the second connection lugs (4a, 4b).

4. The arrangement (10) according to claim 1, wherein the elevated portions (8) each have a dome shape.

5. The arrangement (10) according to claim 1, wherein the first electrical component (1) is a film capacitor and the second electrical component (2) is an electrical bus bar.

6. The arrangement (10) according to claim 1, wherein the cooling plate is mounted on a lateral surface of the main body of the first electrical component (1).

7. An arrangement (10), comprising:
a first electrical component (1) having a first main body and a pair of flat, first connection lugs (3a, 3b) that each extend from a side of the main body along a first direction and are spaced apart from one another along a second, lateral direction that is perpendicular to the first direction;
a second electrical component (2) having a second main body and a pair of flat, second connection lugs (4a, 4b) that each extend from a side of the second main body along a direction opposite to the first direction and are spaced apart from one another along the second, lateral direction, wherein one of the first connection lugs overlaps with one of the second connection lugs along a third direction that is perpendicular to both the first and second directions, and wherein the other first connection lug overlaps with the other second connection lug along the third direction;
an electrically conductive plate (6) which is electrically insulated from the first and second connection lugs (3a, 3b; 4a, 4b) and which is arranged below the first and second connection lugs (3a, 3b; 4a, 4b); and
a multiplicity of electrically conductive elevated portions (8) which are disposed in a region below at least one of the first and second connection lugs (3a, 3b; 4a, 4b) and extend upwardly from the electrically conductive plate (6), wherein an air gap is disposed between the first and second connection lugs (3a, 3b; 4a, 4b) and the conductive elevated portions (8);
wherein the first electrical component (1), the second electrical component (2),
and the first and second connection lugs (3a, 3b, 4a, 4b) together form an open region (A) therebetween, wherein the elevated portions (8) are not directly located under the open region (A) along the third direction.

* * * * *